(12) United States Patent
Skjetne et al.

(10) Patent No.: US 7,794,603 B2
(45) Date of Patent: Sep. 14, 2010

(54) METHOD FOR PURIFICATION OF CONTAMINATED WATER

(75) Inventors: Tore Skjetne, Trondheim (NO); Are Lund, Trondheim (NO); Roar Larsen, Ranheim (NO)

(73) Assignee: EcoWat AS, Trondheim (NO)

( * ) Notice: Subject to any disclaimer, the term of this patent is extended or adjusted under 35 U.S.C. 154(b) by 902 days.

(21) Appl. No.: 10/561,695

(22) PCT Filed: Jun. 24, 2004

(86) PCT No.: PCT/NO2004/000187

§ 371 (c)(1),
(2), (4) Date: Oct. 27, 2006

(87) PCT Pub. No.: WO2005/000746

PCT Pub. Date: Jan. 6, 2005

(65) Prior Publication Data

US 2007/0108131 A1      May 17, 2007

(30) Foreign Application Priority Data

Jun. 27, 2003    (NO)   ................................. 20032985

(51) Int. Cl.
*C02F 1/00*    (2006.01)
(52) U.S. Cl. ........................... 210/705; 62/533; 62/541; 210/711; 210/713; 210/714; 210/737; 210/772; 210/774; 585/15
(58) Field of Classification Search .................. 210/714
See application file for complete search history.

(56) References Cited

U.S. PATENT DOCUMENTS

| 2,904,511 | A |   | 9/1959  | Donath           |         |
|-----------|---|---|---------|------------------|---------|
| 3,058,832 | A |   | 10/1962 | Glew             |         |
| 3,155,610 | A | * | 11/1964 | Williams         | 210/710 |
| 3,217,505 | A |   | 11/1965 | Tuwiner          |         |
| 3,415,747 | A |   | 12/1968 | Glew             |         |
| 6,774,276 | B1| * | 8/2004  | Lund et al.      | 585/899 |
| 7,255,794 | B2| * | 8/2007  | Max et al.       | 210/711 |
| 7,560,028 | B1| * | 7/2009  | Simmons et al.   | 210/639 |

FOREIGN PATENT DOCUMENTS

GB    1 360 797    7/1974
GB    2 358 640    8/2001

OTHER PUBLICATIONS

International Search Report for International Application No. PCT/NO2004/000187 dated Oct. 28, 2004.

* cited by examiner

*Primary Examiner*—Peter A Hruskoci
(74) *Attorney, Agent, or Firm*—Patterson & Sheridan, L.L.P.

(57) ABSTRACT

The present invention concerns a method for purification of contaminated water through hydrate formation and separation of hydrates from contaminated water enriched with contaminants, by supplying hydrate particles to the water during hydrate formation. The present invention also concerns a device for purification of water by using a method according to the invention, and water produced according to the invention. By using the process principles according to the present invention, all types of water can be purified for consumption or safe discharge, or desired resources can be recovered, and air can be purified if it first is bubbled through the water which then is purified by a method according to the invention.

18 Claims, 6 Drawing Sheets

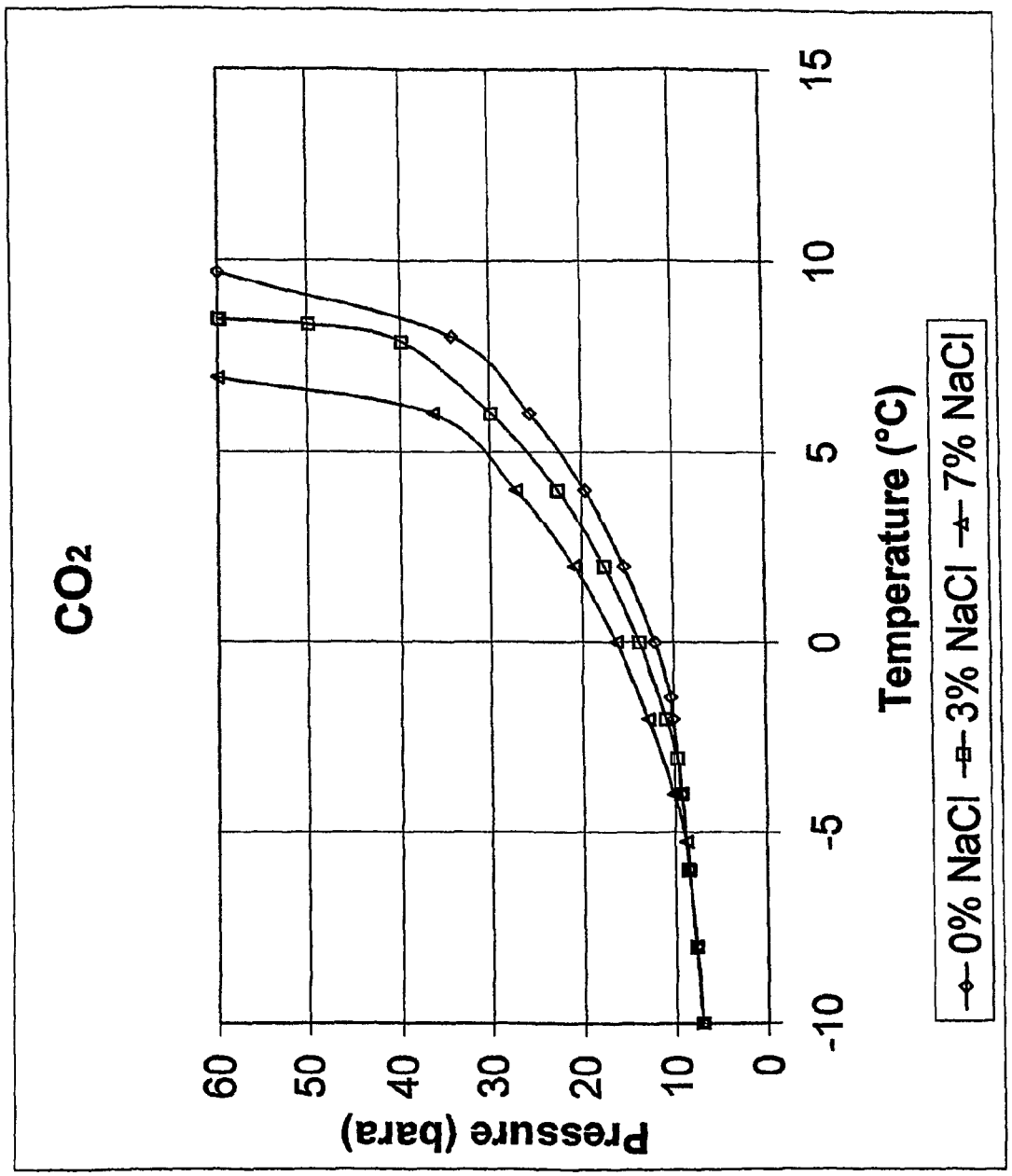
Figure 4. Pressure/temperature relationship for dissociation of hydrates, at different salt concentrations, with $CO_2$ as hydrate forming compound. Forming of hydrate is kinetically controlled and and takes place at conditions above / to the left of the respective curves

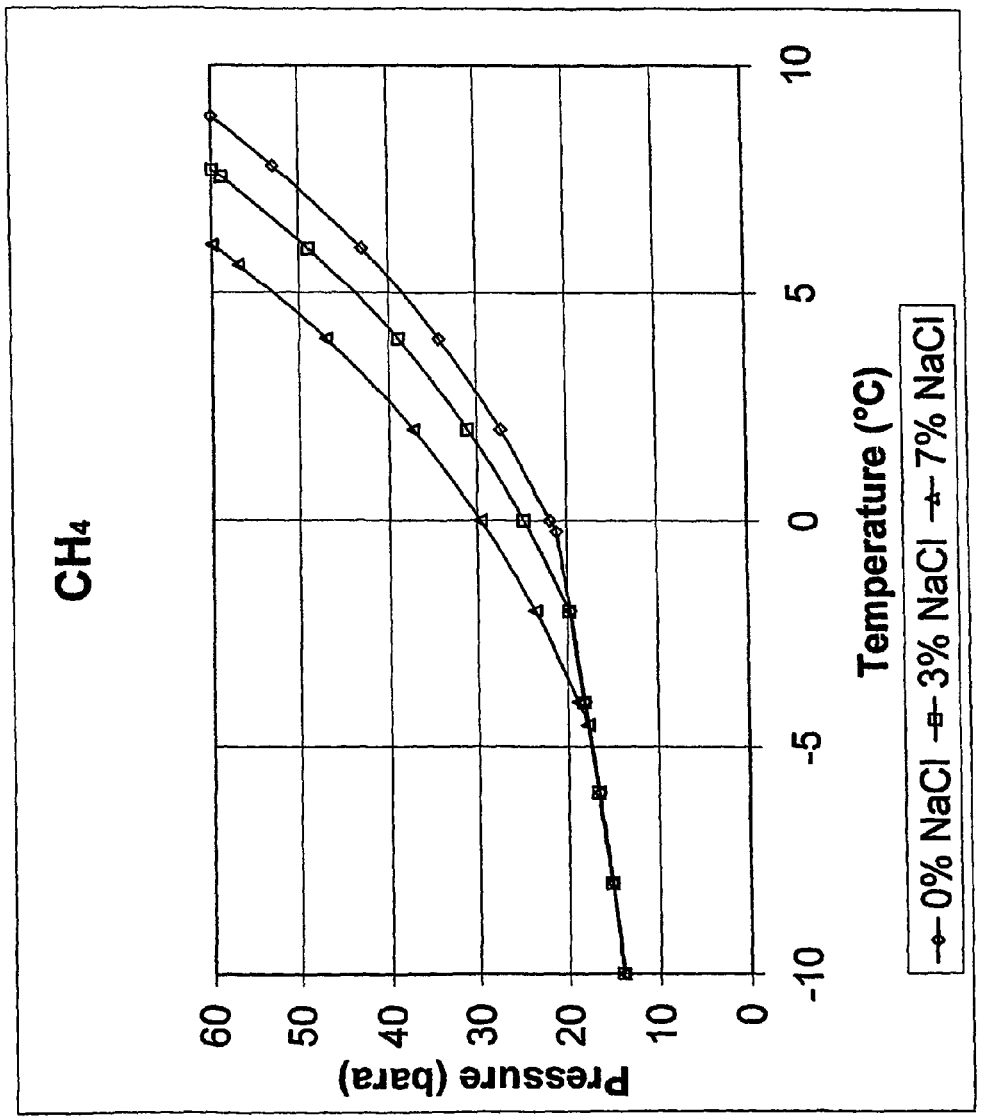
Figure 5. Pressure/temperature relationship for dissociation of hydrates, at different salt concentrations, with $CH_4$ as hydrate forming compound. Forming of hydrate is kinetically controlled and and takes place at conditions above / to the left of the respective curves

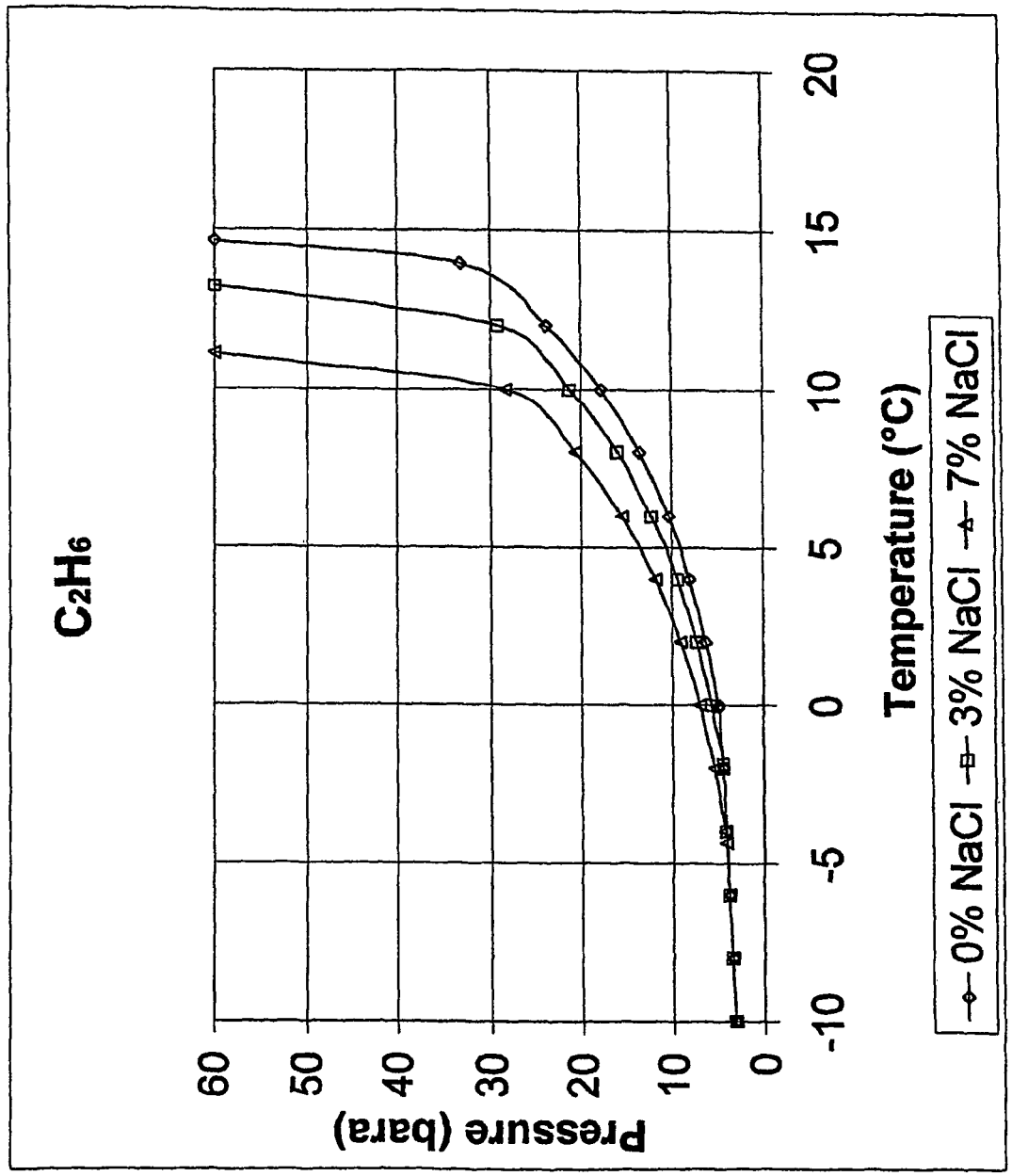
Figure 6. Pressure/temperature relationship for dissociation of hydrates, at different salt concentrations, with $C_2H_6$ as hydrate forming compound. Forming of hydrate is kinetically controlled and and takes place at conditions above / to the left of the respective curves

METHOD FOR PURIFICATION OF CONTAMINATED WATER

The present invention concerns a method and a device for purification of water or air/gas, and water and air/gas purified according to the invention.

BACKGROUND

The need for purification of water can arise in different connections. The purpose can be to provide pure drinking water for consumption, to prevent spill of water soluble or water transported contaminants, to get legal effluents from an industrial process, or to obtain desired components contained in the water, but in concentrations which are too low for general recovery. Primary there are two main groups of water purification; either for production of pure water or for recovery of substances which can be dissolved in the water. Different methods exist for purification of water; filtration, distillation, centrifugation, etc. Many methods are excellent for certain contaminants, but are ineffective for others. Only a few methods are good for all types of water soluble contents.

In connection with recovery of oil, it is a well known problem that also a water phase is produced. This water phase will be contaminated with, among others, hydrocarbons and salts. If this water, also called the "formation water", "produced water" or "production water", is dumped into the environment, in the sea or onshore, it will lead to a big contamination problem. Consequently it will be of importance to purify the water before it is dumped. One alternative is reinjection of the water into the reservoir, but this will entail a cost limiting factor for the oil recovery by the vary fact that there is a limitary factor as to how much oil which can be recovered from a reservoir if all of the produced water is reinjected.

In Norway it has been decided that after 2005 no effluent in the form of production water will be admitted. This means that the only effluent from the process will be pure water. Natural effluents from sediments will occur, but this fact is not taken into consideration here. The Norwegian requirement as to effluent has brought into focus the continuous increasing production of water from Norwegian oil wells.

There is a difference between a requirement of zero effluent in the sense of 0 ppm of anything, and zero harmful effluent. The latter means that a certain amount of substances up to a limit value of concentration and/or total amount and/or together with certain other compounds etc. might be acceptable. There exists many parameters in connection with harmfulness and many of these are hardly known. A further complicating element is that even if some substances are not harmful to the nature, even in big amounts, distinguishing between harmful and not harmful substances can be so problematic that it might happen that zero emission shows the best cost efficiency.

Troll B and C produce approximately 60 000 m³ formation water every 24 hours. This volume requires absolute purification to give an acceptable oil production. It means that a purification process has to handle 2 500 tons of water per hour. Solutions are installed for the purification of the water down to approximately 40 ppm hydrocarbon effluent (among others hydrocyclones, flocculation and filtering processes). In addition, unwanted salts might be discharged and the contaminating hydrocarbons are most likely particularly unwanted in the nature.

It might be possible to inject all of the produced water back into the reservoir from which the oil is recovered or another porous network over or below the producing zone. If all of the water is reinjected, it will, however, quite early in the production process become clearly unprofitable to produce, due to the high water content of the oil. This means that the degree of recovery gets lower than that which else could be reached. It is therefore an object of the present invention to provide a technological solution where absolute pure water is produced in big amounts from the formation water.

An important element of the present invention is that the contaminants are treated, either through recovery as a positive resource, or by safe deposit/disposal.

There exists alternative techniques for purification of water. A good description of these are given in Björn Hansen and Simon R H Davis, "Review of potential technologies for the removal of dissolved components from produced water", IBC Offshore Water Management Conference, Aberdeen, 1993. Table 1 shows a summary of different techniques for purification of the produced water in connection with recovery of hydrocarbons.

TABLE 1

Purification efficiency for different processes for purification of produced water within the oil industry

| Method | Purification efficiency (removed amount) |
| --- | --- |
| Ion exchange | 80% heavy metals |
| Activated carbon | 95% aromatics |
| | 10% light hydrocarbons |
| | 20—50% production chemicals |
| Zeolite adsorption | 40—60% hydrocarbons, |
| | poor removal of added production chemicals |
| Membrane filter | 90% of BTX aromatics, |
| | 15% of phenols, |
| | perhaps 10% of naphtenes |
| "Air Stripping" | ca. 90% of common hydrocarbons, |
| | does not remove phenols, fatty acids or production chemicals |
| Biologic treatment | Good on phenol and fatty acids (30—90%), for others bad |

Since the present invention results in completely pure water, it is obvious that the method is much more efficient than the processes which are known from the earlier technique.

It has previously been shown in British patent GB 1.360.797, from 1973, that contaminated water can be purified through the formation of hydrates. This patent concerns the specific use of trichlorofluoromethane and 3-bromopropene separately or in mixture to make the hydrate. Nothing is mentioned about the fact that hydrates can be formed with hydrocarbon gases. It is a weakness with this patent that they use methane and propene halogenides. It is generally known that halogenides are not especially favourable when they are set free into the nature. Nor is the efficiency of the process with large amounts of dissolved salts, and how they will purify the water when the salt concentration gets high, described in the patent. It seems as if this is especially intended for contaminated surface water, e.g. from a river. In such water the target will be to take out pure water for consumption or industrial purposes, but there is no focus on what to do with the rest.

In U.S. Pat. No. 2,904,511, from 1955, it is also dealt with the production of pure water from salt water. This patent sets focus on the production of pure water from sea water, and it is based on taking out pure water by means of a hydrate process, whereas the more concentrated salt water which becomes the byproduct in the process, is discharged continuously. The elements with hydrate formation, hydrate harvesting, washing and also recirculation of hydrate forming compound and collection of pure water, are similar to our suggestions. This US-patent does not, however, take organic contaminants into consideration.

It is further shown in British patent GB 1.320.134, from 1973, as also in the two above mentioned (GB 1.360.797 and U.S. Pat. No. 2,904,511), that pure water from salt or brackish water is the target. The most conspicuous with this patent is that they use natural gas to form the hydrate, whereby two goals are achieved; pure water and pure natural gas. Natural gas will from the gas reservoir have a complex make-up with a content of more heavy hydrocarbons. Before transportation of LNG it will be advantageous if the more heavy components were gone, and this can be achieved through hydrate formation. Although they mention that contaminated water can pass through the process several times; the fact that the increased amount of salt will lead to a stop in the process is not taken into account. Nor is there paid any interest in what happens with the contaminated water leaving the process.

A further reference describing earlier technique is of a more recent date, from 2001: PCT/US01/27720, with the heading: "Improved hydrate desalting for water purification". Focus in the reference is the temperature control in the water phase which is going to be purified to get an efficient process with regard to energy balance. The process is focusing only on the production of pure water for consumption without paying any attention to what has to be done with the contaminants.

Norwegian patent NO 311.854 concerns a method and a system for transportation of a stream of fluid hydrocarbons containing water. In this patent focus is directed towards the continuous formation of gas hydrates in a process stream to ensure good transportation of fluids containing water in pipelines through areas with low temperature. The hydrates are harvested out of the transportation pipeline in such a way that no hindrances arise in the pipeline transport and in such a manner that continued hydrate formation from the sources are secured.

Common for earlier technique is that it is not focused on what shall happen with contaminants and salts which are removed from the water. Further, none of the references from earlier technique are directed towards the purification of the production water from the oil industry. The water they are directing their attention to is sea water, brackish water or contaminated surface water. Thereby they are not paying any attention to the fact that industrial processes can get into a situation where they have to make a halt because they contaminate the nature.

Nothing has been found in earlier technique concerning the handling of the contaminants. On the other hand, it is at least of equal importance that nothing in earlier technique regarding water purification concerns the uncertainty around the nucleation of hydrates. In this area, the present invention presents a significant improvement.

Within the oil production it is traditionally endeavoured to avoid hydrate formation because hydrates implies the risk of clogging of pipelines, which leads to operational problems and can constitute a security risk.

The object of the present invention is exactly that industrial processes should be made both ecological acceptable and cost efficient in the same operation. The primary object of the present invention is linked to production of oil/gas, but even if the invention is described mainly with reference to oil/gas production, it is equally relevant for other types of industries—for instance paper production, recovery plants for nuclear waste, spills from ships to sea, recirculation of water during space travel, etc.

It is therefore a need for a method for absolute purification of contaminated water. The purpose is to produce completely pure water which can be discharged into the nature without any risk for the environment. The process will not always be able to purify the whole amount of water, there will be a rest which will be strongly concentrated with contaminants. Because the concentration increases, other methods can be used with considerably higher efficiency and thereby contribute to a cost effective production of e.g. oil/gas, even if the amount of water in the production stream increases further. The final rest of contaminated water phase can e.g. be reinjected in the reservoir without any risk for the nature. It is obvious that this process can be utilized to satisfy many industrial and social needs.

An important aspect in addition to the requirement of making the process effective and thereby less energy consuming, is the question of how to utilize all the waste heat. The waste heat could be used as remote heating both in housing areas on oil platforms and in other installations where heat supply is required. Cables could in principle be built down to wellheads as well as pipelines for the heating of these so that plugging is avoided. In any case, some means could reduce those costs, both by the methods and devices according to the present invention and generally in the constructions on the platforms.

SHORT DESCRIPTION OF THE INVENTION

The most important aspect of the present invention is that it takes care of the whole water stream in connection with the production process. Nothing is discharged into the nature. If for instance active heat pumps are used, the process with regard to energy can be carried out without high costs. For some of the current application areas non-traditional elements are introduced into the industrial process. For instance in oil/gas operations this applies to the hydrates, for which surprisingly the possibility for positive utilization has been found; normally the hydrate formation is inhibited because hydrate formation can lead to the blocking of pipelines with appurtenant operation problems and security risks. For other uses, it is something entirely new to consider the water purification as a method of purification of air. In the industry all kinds of garbage can be taken care of and knowledge about sediments can be used to ensure long time storage of the concentrated substances.

In one aspect, the present invention concerns a method for purification of contaminated water by hydrate formation and separation of hydrates from contaminated water enriched with contaminants, characterized in that the method comprises addition of hydrate particles to the water during hydrate formation.

In one embodiment, the method comprises further handling of contaminants separated off. These off-separated contaminants can comprise one or more components selected from the group which consists of hydrocarbons, organic and inorganic salts, dust, mud, metals, sand, gas, radioactive components, and biological material. The handling of the contaminants which have been separated off can take place by recirculation to process steps upstream or depositing/disposal.

In another embodiment the method comprises the following steps:
  a) supplying hydrate forming compound and hydrate seeds to the water;
  b) formation of hydrates under suitable conditions of pressure and temperature;
  c) harvesting of the hydrates from contaminated water;

d) dissociation of the hydrates to pure water and hydrate forming compound.

The purification process can be carried out in several steps by subjecting the contaminated water from step c) to repeated hydrate formation processes in series until the concentration of contaminants in the contaminated water is too high for further hydrate formation.

If the purification process is carried out in several steps, these can be:
a) supplying hydrate forming compound and hydrate seeds to the water;
b) formation of hydrates under suitable conditions of pressure and temperature;
c) harvesting the hydrates from contaminated water;
d) dissociation of the hydrates to pure water and hydrate forming compound;
e) supplying hydrate forming compound and hydrate seeds to the contaminated water from step c);
f) formation of hydrates under suitable conditions of pressure and temperature;
g) harvesting the hydrates from contaminated water;
h) dissociation of the hydrates in pure water and hydrate forming compound;

If necessary, the process can be repeated further times.

The concentration of contaminants in the contaminated water can be at least 10% by weight, preferably at least 12% by weight, more preferred at least 15% by weight when the process is terminated.

In a further embodiment of the present invention the harvested hydrates from step c) are subjected to a washing step before dissociation to pure water and hydrate forming gas.

The hydrate forming compound supplied in step a) can be selected from lower hydrocarbons, $CO_2$, halogenated hydrocarbons, where halogen is selected from chlorine and fluorine, tetrahydrofuran, ethylene oxide, noble gases selected from helium, neon, argon, xenon, krypton, sulphur hexafluoride, dinitrogen oxide. Preferably the hydrate forming compound can be $C_1$-$C_5$ hydrocarbons or $CO_2$, more preferred methane, ethane, propane, $CO_2$, most preferred methane or $CO_2$.

When the method according to the invention is carried out, the conditions of pressure and temperature preferably can be T<30° C., P>1 bar, preferably T<20° C., P>5 bar, most preferred T<10° C., P>20 bar. Further the hydrate particles can be supplied by recirculation of hydrates from step c), and the hydrate particles which are supplied to the hydrate formation step can have a diameter of maximum 3 mm, preferably maximum 500 μm, still more preferably maximum 100 μm.

In still another embodiment of the present invention the harvesting of the hydrates in step c) takes place in a conventional separation process, and this hydrate harvesting process can be selected from the group consisting of sedimentation, filtering, centrifugation, flotation. After the separation in contaminated water enriched with contaminants and hydrates, the hydrates can be dissociated by an increase in temperature and/or a reduction in pressure.

The pure water which is produced by the method according to the invention and which is leaving the process from step d) can be adequately pure to be used as drinking water or can be discharged.

In a further aspect the invention comprises a method for purification of gas, where the gas is bubbled through water for transfer of gaseous contaminants to the water, before the water is subjected to a method for purification of water according to the present invention.

In a further aspect the invention concerns a device for purification of contaminated water, and is characterized in that it comprises:
a) a unit for mixing hydrate forming compound, hydrate seeds and contaminated water under cooling and pressurization;
b) device for harvesting the hydrates from contaminated water;
c) device for dissociation of the hydrates in pure water and hydrate forming compound;

In one embodiment the device comprises further devices for water purification, as mentioned above installed in series sufficient times to achieve a satisfactory concentration of the contaminants.

If the device goes over several steps, these can be:
a) a unit for mixing hydrate forming compound, hydrate seeds and contaminated water under cooling and pressurization;
b) a device for harvesting the hydrates from contaminated water;
c) a device for dissociation of the hydrates in pure water and hydrate forming compound;
d) a unit for mixing hydrate forming compound, hydrate seeds and contaminated water from step b) under cooling and pressurization;
e) a device for harvesting the hydrates from contaminated water;
f) a device for dissociation of the hydrates in pure water and hydrate forming compound;

The device for purification of water according to the invention can be used for purification of the produced water during recovery of hydrocarbons.

In a further aspect the invention concerns a device for purification of air/gas, characterized in that the device comprises:
a) a unit for transfer of gaseous components from the gas to be purified, to water;
b) a unit for mixing hydrate forming compound, hydrate seeds and contaminated water under cooling and pressurization;
c) a device for harvesting the hydrates from contaminated water;
d) a device for dissociation of the hydrates in pure water and hydrate forming compound.

In further aspects the invention concerns water or air/gas, characterized by being purified by a method according to the invention.

Embodiments of the invention will in the following be described with reference to the figures, where:

FIG. 4 shows pressure/temperature relations for dissociation of hydrates, at different salt concentrations, with $CO_2$ as hydrate forming compound. Hydrate formation is kinetically controlled and takes place at conditions above/to the left of the respective curves.

FIG. 5 shows pressure/temperature relations for dissociation of hydrates, at different salt concentrations, with $CH_4$ as hydrate forming compound. Hydrate formation is kinetically controlled and takes place at conditions above/to the left of the respective curves.

FIG. 6 shows pressure/temperature relations for dissociation of hydrates, at different salt concentrations, with $C_2H_6$ as hydrate forming compound. Hydrate formation is kinetically controlled and takes place at conditions above/to the left of the respective curves.

DETAILED DESCRIPTION OF THE INVENTION

Figure 1:
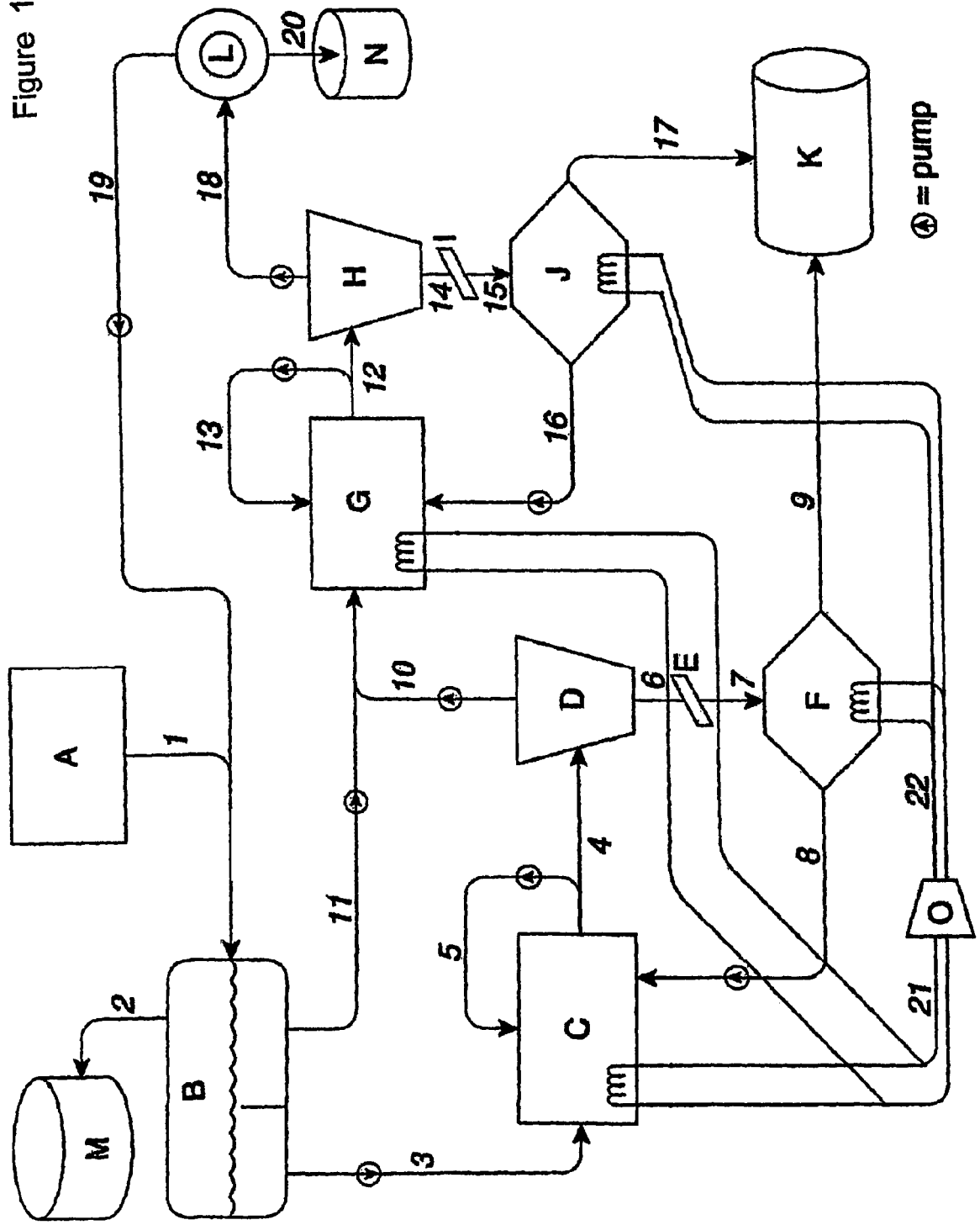
FIG. 1 shows a flow sheet for the method according to the invention for purification of produced water.

The present invention is based on the fact that hydrate forming compounds are forming stable hydrates together with water at certain pressure and temperature conditions. Hydrate forming compounds are characterized by the fact that they are relatively small, not polar molecules, primary lower hydrocarbons, e.g. methane, ethane and propane, but also carbon dioxide, nitrogen, oxygen, dihydrogen sulphide, halogenated hydrocarbons wherein halogen is selected among fluorine and chlorine, tetrahydrofuran, ethylene oxide, noble gases, such as helium, neon, argon, xenon, krypton, sulphur hexafluoride and dinitrogen oxide can be used. The hydrate consists of hydrate forming molecules which are surrounded by water molecules. The stable hydrate structure contains no salts nor other hydrocarbons. The hydrates are harvested by separating them from the contaminated water which now is enriched with contaminants. The pure water is liberated by a change in the pressure and temperature conditions, which gives dissociation of the hydrates in the hydrate forming compound and pure water. The liberated hydrate forming compound is pumped back into the process, while the pure water can be used as water for consumption or can be let out directly as it is now clean.

The water to be purified is filled into a tank with the proper pressure, temperature, and possibly agitation for optimal formation of hydrates. The hydrate forming compound is mixed into the water—in the cases where the hydrate forming compound is gaseous, this is bubbled into the water. Hydrate formation is spontaneous as long as hydrate seeds are present in the tank. It is of importance for the process efficiency that hydrates are present, these are therefore supplied from external sources.

Supply of hydrate seeds is maintained by means of a loop in the process equivalent to patented technology, Norwegian patent No. NO 311.854. This patent concerns a method for reducing the use of chemicals and problems in pipelines transporting hydrocarbons, and is—in a few words—aimed at succeeding in controlled growth of hydrate particles on hydrate seeds being recirculated in the process. The growth is then proceeding in an efficient way, so that hydrate formation becomes rapid and complete in the sense that all of the water is converted. A "metastable" period of waiting for the nucleation to take place is thereby avoided, and it is also avoided that the hydrate particles are growing as shells around water drops. If the hydrates are growing as shells around water drops, this will lead to encapsulation of water and impurities, and these impurities continues to be drawn along in the process.

One aspect of the present invention concerns a method where the water from the daily cleaning process is taken out and submitted to an extended purification with completely pure water as an aim. The process can be carried out in several steps, and from each step completely pure water is recovered and at the same time unwanted substances in the water stream which continues in the process are concentrated. If the process proceeds over several steps, the water stream with concentrated contaminants is further purified by repeating the first process in a separate process, not by recirculation. Each time hydrate is harvested from the respective process steps, the hydrate can be washed if necessary with completely pure water. The washing water is in this case passed on further in the process so that it also will be purified and taken care of.

When the concentration of (salt) contaminants has reached more than approximately 25% by weight, the process cannot be repeated. Salt is then removed by purifying the water over membranes and/or by reverse osmosis. It is primarily the salt concentration which is limitary for the height of the concentration at which hydrate formation can take place, but also other polar compounds which "compete for the water" contribute to this effect. The theoretical concentration limit for formation of hydrates therefore varies a little, dependent on which compound(s) constitute(s) the contamination in the water; e.g. the limit is somewhat higher than 25% by weight by methanol contamination. All of this is well known for someone skilled in the art. On this level in the purification process a big part of pure water is harvested, e.g. over 50% pure water. In some cases as much as approximately 90% pure water of the initial amount of water is recovered and is liberated for dumping or consumption.

Through the steps in the process a hydrocarbon phase will also proceed at the same time as an increase in concentration takes place. The hydrocarbons, which are unwanted in the produced water, can be regained, e.g. by means of a chemical extraction and centrifugation. This represents traditional technology for feedback of hydrocarbons to the hydrocarbon production. The part of water in this residual fluid then can be so small that it is without importance for the rest of the process. Seen as a whole, it can be favourable to pass the hydrocarbon part back into the original inlet stream from the oil wells so that the hydrocarbons can be recovered. In addition to the hydrocarbons also added chemicals, e.g. surfactants, are recovered for re-use in the hydrocarbon recovery process.

The last rest of water which is not clean can in connection with oil/gas production be reinjected in the reservoir or another porous structure in the sediments. At this level in the purification process, the volume of liquid which is reinjected is considerably reduced. Thereby it becomes possible to accomplish spill free oil/gas production.

The same principle can be asserted in any industrial process which can give an unwanted discharge. Since the purification gives quite pure water, the contaminants will be concentrated in a small volume of rest liquid. This liquid can possibly also be stored for a long time in stable sediments accessible either from land or at sea. However, it is likely that the process with removal of pure water makes it possible to make use of the contaminants as a resource instead of considering them as a problem.

An alternative exploitation of the purification process is in connection with the manufacture of pure potable water/consumption water from rivers, lakes, ground water or sea water. These water sources will not carry the same amounts of hydrocarbons, and can consequently be purified in a relatively simple manner. One single passage of the water can be sufficient in the above mentioned purification process. After the single passage pure water is harvested out, while the contaminated water is passed back to the source. If the source during the next pass becomes considerably enriched in contents which are not desirable, other devices can be connected with the process to remove the contaminants, e.g. hydrocarbons and/or salts so that there is no hazards for the environment, and at the same time water can be manufactured in a cost efficient manner. The process can be implemented everywhere to costs which makes it interesting also for consumers that have less ability to pay. The present invention can again claim to be a significant improvement of earlier similar methods, since the recirculation of hydrate particles also in the new utilization will avoid the problems in connection with nucleation of hydrates, and this will also lead to the process being carried out under less extreme conditions than normally, i.e. at higher temperatures and lower pressure than in the "traditional" hydrate processes where these variables have to be made extreme to achieve the wanted effect on nucleation and formation of seeds/crystals.

When the method is used for the manufacture of potable water/consumption water, biological acceptable hydrate forming compounds, e.g. carbon dioxide, oxygen, nitrogen, noble gases, etc. are used. Harvesting of hydrate takes place at the bottom or at the top of the production chamber dependent on properties of the hydrate forming compounds. By using $CO_2$ the density of the hydrates becomes larger than that of the water, and the hydrates are harvested at the bottom of the production chamber. Since this process is not giving the extremely large accumulation of salt which occurs in the method in connection with purification of produced water, it will be cheaper. If the energy can come from solar energy, or other environmentally sound sources, the process will be very favourable.

The present invention is unique by the very fact that it improves the process by forming hydrates from sea water as all uncertainty in connection with the nucleation and the crystal initiation is avoided. This is initially a stochastic (random) process, which leads to a period of waiting of hours or days for the spontaneous forming of the hydrates. Surprisingly, it was found that elements from Norwegian patent NO 311.854 can be used for ensuring that the growth proceeds without any delays, by letting the process continuously be supplied with new "seeds" in the form of existing hydrate particles. Earlier technology, as the one described in U.S. Pat. No. 2,904,511 and in the following sections, also suffers from an additional weakness, i.e. that at the moment when hydrate particles are formed, they willingly encapsulate water (with the content of contaminants) in the form of drops with hydrate shell and similar geometrical formations, which is completely avoided by using the technology in NO 311.854, as an element of the present invention. Such an encapsulation of water with impurities/contaminants acts very negative on the efficiency in the process, because these contaminants continue to be drawn along with the pure water, and will be blended with the pure water which comes from the later dissociation of the hydrates.

The process of hydrate formation is exothermic, the produced heat can be used as energy for the process of hydrate dissociation, which naturally is endothermic. The process can therefore be provided with equipment for optimal exploitation of the energy, e.g. heat exchangers.

The hydrate can be transported away from the hydrate formation tank and be put in a new device where the pressure is reduced and/or the temperature is increased to dissociate the water from the hydrate forming compound. The hydrate forming compound is transported back to the first step in the process, while the pure water either is discharged or is used as pure water.

When the water to be purified is produced water, it will prior to purification contain salts and hydrocarbons. The salts will generally be dominated by sodium chloride, but other salts can also be present. The hydrocarbons will be water soluble compounds and/or emulsified drops of oil-in-water. During the process, the water stream will be enriched in salt and hydrocarbons, these can be separated off so that the process does not stop. The hydrocarbons can be extracted out or separated off by means of membranes. The salts can be removed over ion selective membranes or by reverse osmosis. Finally an amount of rest water remains, and it is not profitable from an economic point of view to purify this, it can e.g. be injected in a suitable porous part in the reservoir. Since the amount of rest water is low, the whole process can be a good alternative to full reinjection.

It is especially the other salts apart from NaCl which also can be of interest for increased oil recovery, because these can be added to sea water being used for injection to maintain the pressure and the production rate in the reservoir. The gain by passing the salts back is that the injected water then becomes more equal to the formation water, and thereby the risk of scale formation in the pore structure is reduced.

When pure water is removed from the produced water, the concentration of hydrocarbons in the contaminated water will increase. This will be favourable for separating out more hydrocarbon, because emulsified droplets then can coalesce with other droplets and thereby become big enough, so that they can separate out of the water directly in the same manner as in the separators. If separating out the hydrocarbons to product entails any problems, they can be reinjected in the reservoir. It is expected that more of these hydrocarbons can be important for the recovery because they can be used in mud or by chemical flooding/cleaning.

It would therefore be very profitable for the oil production if the reinjected amount of water could be reduced. A reinjection of merely 10% of the produced water would for example be very advantageous. The efficiency of the present invention can be even better, a reinjection of only 10% of the produced water can be achieved. With an optimum exploitation of the process, it is conceivable that as little as 5% of the produced water is reinjected, in some cases a reinjection of as little as 1% of the produced water can be achieved.

The system according to the present invention can be installed on the existing production sites. As long as gas is being produced at the site, the hydrate forming compound in the form of gas(es) can be taken from this production, otherwise a gas reservoir and a gas loop have to be installed.

The purification process according to the present invention has a global market connected to all production of hydrocarbons from sediments. There will be a great need in connection with the North Sea and the Norwegian oil production, but all wells will sooner or later produce water, and then a need will arise. It is not certain that all countries will impose on the producers an absolute requirement of zero discharge which Norway now does, but a company that have zero discharge as its policy will undoubtedly be preferred as producer in preference to those who do not take an equally high responsibility for the environment.

The device for water purification according to the present invention could be installed on hydrocarbon production units, particularly platforms, in connection with the existing separators.

However, the market for the method of water purification into pure water is bigger than on the oil production market. There is a great need for a supply of pure water at different places in the world. This need can be covered by means of desalting of sea water. Technology for desalting of sea water has been patented and produced a long time ago, but where no sea water is available the formation water from the water reservoirs can be just as good a source for water. It will then be a need for a well functioning water purification, and the hydrate technique according to the present invention can be competitive to desalting.

A further exploitation of the present invention is in connection with space travels where the need for pure water also is an important factor. In this connection, the recirculation of water will be crucial, particularly during a long lasting stay in the space. The method according to the present invention can e.g. be carried out in space ships/space stations and can also be activated on other space bodies. Contaminated water can either originate from the original reservoir in the ship or from a possible source on/in the space body. By the use of such a method, it will probably be most favourable to use biological acceptable hydrate forming compounds, e.g. carbon dioxide, oxygen, nitrogen, noble gases, etc., but from an economic point of view, carbon dioxide would probably be preferred. The energy in the process will be spent on maintaining the gas pressure in order to be in stable hydrate formation. In the outer space there will generally be no need for cooling.

Other additional uses of the present invention are many industrial land based processes leading to the discharge of contaminated water. The contaminants can have organic (such as "pulp&paper" industry) and/or inorganic (such as waste disposal plants for nuclear power production) character. Some of the industrial processes can also lead to discharge of microbiological contaminants (such as fermentation processes or sewer). The hydrate process according to the present invention can be adjusted to all of these with the purpose that pure water can be taken out, contaminated water can go through the process many times, and the final step is directed towards taking care of the contaminated part without having to dump it back into the nature, but by finding acceptable long time deposits for it, e.g. in reservoirs in deep and stable sediments.

Another further exploitation is purification of air, which also can be carried out by means of the method and device according to the present invention. It is assumed that air is bubbled through a water reservoir, where the water soluble and emulsifyable components in the air can be taken out. The water phase can be purified by means of the method according to the present invention. By means of this embodiment resources in connection with industrial processes can be recovered. Such an embodiment can also be considered introduced in areas where many people reside in a limited area where the risk of diseases being spread through droplet infection is a problem.

A further exploitation of the method is for the recovery of water soluble substances and minerals from the sea. This can be done for the purpose of removal of an unwanted compound or for the exploitation of an otherwise unavailable resource.

In the following, the invention will be further illustrated by means of the following illustrating, but not limiting exemplary embodiments.

Exemplary Embodiments

Purification of Produced Water in Connection with Industrial Petroleum Activity

The water to be purified is passed through a pipe (3) into a first container (C) at suitable pressure and temperature conditions (shown in Tables 2, 3 and 4 and FIGS. 1, 4, 5 and 6) to achieve hydrate formation. In the container (C) the water is mixed with a hydrate forming compound which is supplied via a pipe (8). Hydrate grains are supplied via a pipe (5). The mixture of hydrate/contaminated water is passed via a pipe 4 to a separator (D) where the mixture is separated into contaminated water and pure hydrate. The hydrate is passed to a container (F) via a pipe (6/7); if necessary the hydrate can be washed in a suitable container (E). In the container (F) the temperature is raised so that the hydrate dissociates in pure water and hydrate forming compound. The pressure can also be lowered, but of process reasons it is favourable to maintain the pressure. The hydrate forming compound from container (F) is passed back to the first container for hydrate formation (C) via pipe (8). The pure water is passed to a container (K) for pure water via pipe (9).

The contaminated water from the first separator step (D) is passed via a pipe (10) to a second container (G) for hydrate formation. In the container (G) the water is mixed with the relatively pure water which is supplied through pipe (11) from the separator (B) and a hydrate forming compound under suitable pressure and temperature conditions (shown in Tables 2, 3 and 4 and FIGS. 1, 4, 5 and 6). The hydrate forming compound is supplied via a pipe (16). Hydrate grains are supplied via a pipe (13). The mixture hydrate/contaminated water is passed via a pipe 12 to a separator (H) where the mixture is separated in contaminated water and pure hydrate. The hydrate is passed to a container (J) via a pipe (14/15); if necessary the hydrate can be washed in a suitable container (I). In the container (J) the temperature is raised so that the hydrate dissociates into pure water and hydrate forming compound. The pressure can also be lowered, but of process reasons it is favourable to maintain the pressure. The hydrate forming compound from container (J) is passed back to the second container for hydrate formation (G) via pipe (13). The pure water is passed to a container (K) for pure water via pipe (17).

If it is required, the contaminated water from the second separation container (H) can be purified by conventional purification processes (L) to obtain hydrocarbons for recirculation to the hydrocarbon recovery process via pipe (19) and contaminated water for depositing/reinjection (N).

Purification of Water

Figure 2:
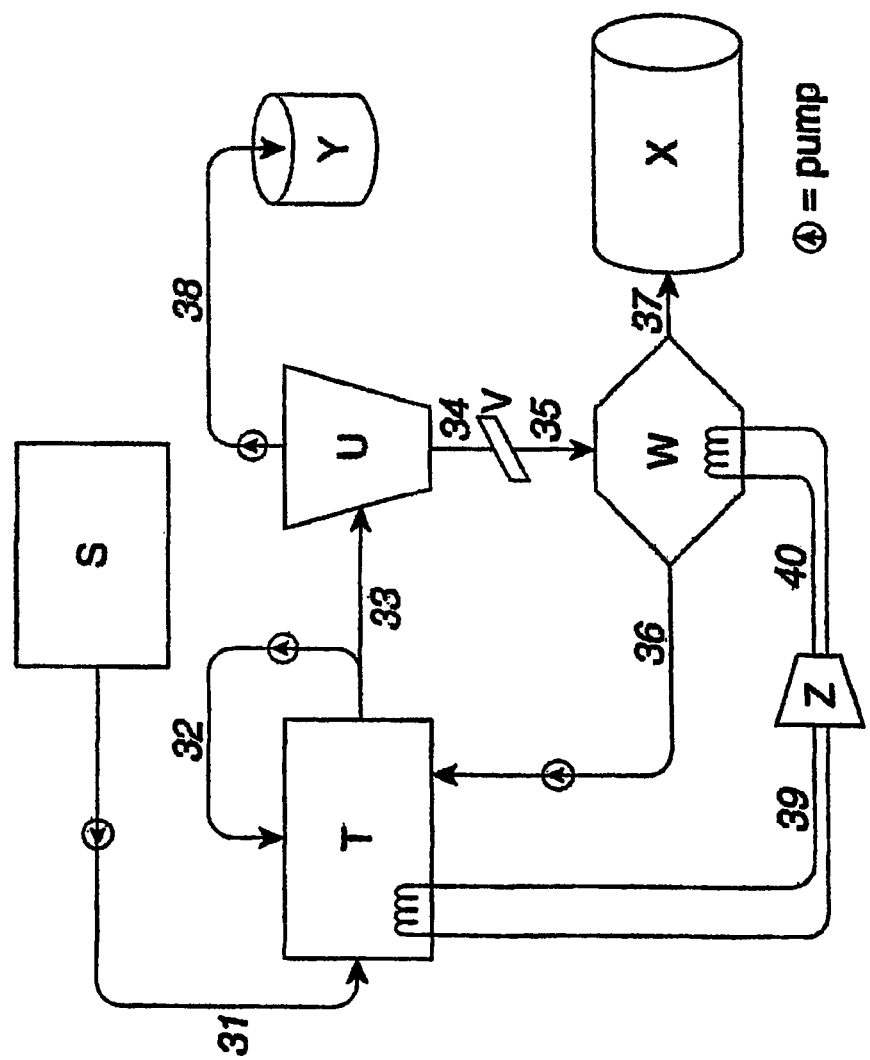
FIG. 2 shows a flow sheet for the method according to the invention for purification of water from a water source to drinking water.

The water to be purified is passed via a pipe (31) into a container (T) with suitable pressure and temperature conditions to obtain hydrate formation (shown in Tables 2, 3, 4 and FIGS. 2, 4, 5 and 6). In the container (T) the water is mixed with a hydrate forming compound which is supplied via a pipe (36). Hydrate grains are supplied via a pipe (32). The mixture of hydrate/contaminated water is passed via a pipe 33 to a separator (U) where the mixture is separated into contaminated water and pure hydrate. The hydrate is passed to a container (W) via a pipe (34/35); if necessary, the hydrate can be washed in a suitable container (V). In the container (W) the temperature is raised so that the hydrate dissociates into pure water and hydrate forming compound. The pressure can also be lowed, but of process reasons it is favourable to maintain the pressure. The hydrate forming compound from container (W) is passed back to the container for hydrate formation (T) via pipe (36). The pure water is passed to a container (X) for pure water via pipe (37). The contaminated the water is passed to a deposit area (Y) via pipe 38—it can be discharged or handled otherwise.

This embodiment can be contemplated used for purification of almost all types of water that contains contaminants. Examples are the purification of salt water for consumption, surface or ground water for consumption, water in connection with space operations, effluent water from industrial processes.

Purification of Air

Air or gas to be purified is passed via a gas pipe (41) to a container (S) containing water. By setting the process conditions, the contaminated gas(es) is/are transferred to the liquid phase, while the purified air leaves the container (S) via an effluent pipe (42).

Figure 3:
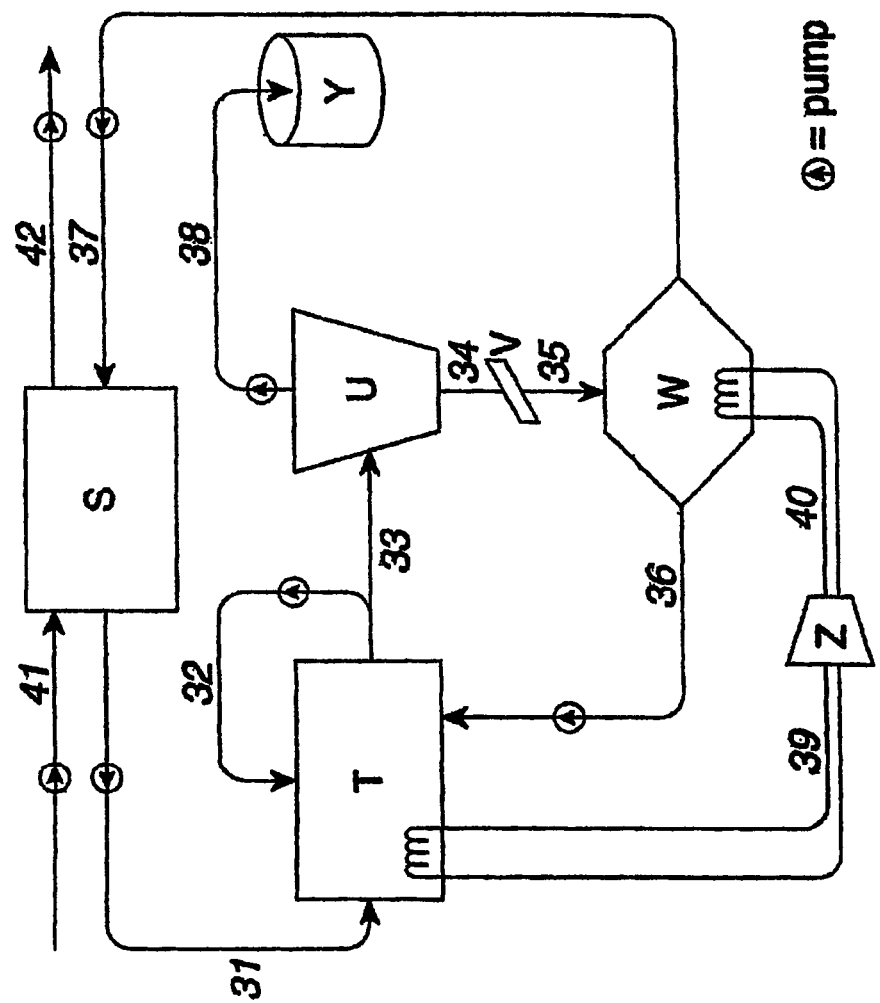
FIG. 3 shows a flow sheet for the method according to the invention for purification of gas/air.

The water which has taken up the contaminants is passed via a pipe (31) into a container (T) with suitable pressure and temperature conditions for obtaining hydrate formation (shown in Tables 2, 3 and 4 and FIGS. 3, 4, 5 and 6). In the container (T) the water is mixed with a hydrate forming compound which is supplied via a pipe (36). Hydrate grains are supplied via a pipe (32). The mixture of hydrate/contaminated water is passed via a pipe 33 to a separator (U) where the mixture is separated into contaminated water and pure hydrate. The hydrate is passed to a container (W) via a pipe (34/35); if necessary, the hydrate can be washed in a suitable container (V). In the container (W) the temperature is raised so that the hydrate dissociates into pure water and hydrate forming compound. The pressure can also be lowered, but of process reasons it is favourable to maintain the pressure. The hydrate forming compound from container (W) is passed back to the container for hydrate formation (T) via pipe (36). Pure water is passed to the container (S) via a channel (37) from container (X) with pure water. The contaminated water is passed to a deposit area (Y) via pipe 38—it can be discharged or handled otherwise.

TABLE 2

Exemplary connection between hydrate forming compound and suitable pressure and temperature conditions to obtain hydrate formation with $CO_2$ as the hydrate forming compound. Hydrate formation is kinetically controlled and takes place at conditions above the curves shown in FIG. 4.

| 0% NaCl | | 3% by weight NaCl | | 7% by weight NaCl | |
|---|---|---|---|---|---|
| Temp. °C. | Pressure Bar | Temp. °C. | Pressure Bar | Temp. °C. | Pressure Bar |
| −10 | 7.16 | −10 | 7.16 | −10 | 7.16 |
| −8 | 7.82 | −8 | 7.83 | −8 | 7.83 |
| −6 | 8.54 | −6 | 8.54 | −6 | 8.54 |
| −4 | 9.29 | −4 | 9.29 | −5.25 | 8.81 |
| −2 | 10.09 | −3.06 | 9.66 | −4 | 10.12 |
| −1.43 | 10.33 | −2 | 10.86 | −2 | 12.79 |
| 0 | 12.08 | 0 | 13.75 | 0 | 16.27 |
| 2 | 15.34 | 2 | 17.55 | 2 | 20.87 |
| 4 | 19.67 | 4 | 22.66 | 4 | 27.18 |
| 6 | 25.59 | 6 | 29.83 | 6 | 36.36 |
| 8 | 34.17 | 7.86 | 39.83 | 6.93 | 60 |
| 9.69 | 60 | 8.31 | 49.83 | | |
| | | 8.44 | 59.83 | | |
| | | 8.44 | 60 | | |

TABLE 3

Exemplary connection between hydrate forming compound and suitable pressure and temperature conditions to obtain hydrate formation with $CH_4$ as the hydrate forming compound. Hydrate formation is kinetically controlled and takes place at conditions above the curves shown in FIG. 5.

| 0% NaCl | | 3% by weight NaCl | | 7% by weight NaCl | |
|---|---|---|---|---|---|
| Temp. °C. | Pressure Bar | Temp, °C. | Pressure Bar | Temp. °C. | Pressure Bar |
| −10 | 13.98 | −10 | 14.04 | −10 | 14.04 |
| −8 | 15.25 | −8 | 15.32 | −8 | 15.32 |
| −6 | 16.62 | −6 | 16.71 | −6 | 16.71 |
| −4 | 18.1 | −4 | 18.2 | −4.52 | 17.8 |
| −2 | 19.69 | −2.01 | 19.79 | −4 | 18.86 |
| −0.24 | 21.18 | −2 | 19.81 | −2 | 23.63 |
| 0 | 21.88 | 0 | 24.79 | 0 | 29.64 |
| 2 | 27.35 | 2 | 31.03 | 2 | 37.24 |
| 4 | 34.24 | 4 | 38.92 | 4 | 46.95 |
| 6 | 42.95 | 5.99 | 48.92 | 5.63 | 56.95 |
| 7.81 | 52.95 | 7.57 | 58.92 | 6.07 | 60 |
| 8.88 | 60 | 7.72 | 60 | | |

TABLE 4

Exemplary connection between hydrate forming compound and suitable pressure and temperature conditions to obtain hydrate formation with $C_2H_6$ as the hydrate forming compound. Hydrate formation is kinetically controlled and takes place at conditions above the curves shown in FIG. 6.

| 0% NaCl | | 3% (weight) NaCl | | 7% (weight) NaCl | |
|---|---|---|---|---|---|
| Temp. °C. | Pressure Bar | Temp. °C. | Pressure Bar | Temp. °C. | Pressure Bar |
| −10 | 3.16 | −10 | 3.16 | −10 | 3.16 |
| −8 | 3.46 | −8 | 3.46 | −8 | 3.46 |
| −6 | 3.78 | −6 | 3.78 | −6 | 3.78 |
| −4 | 4.13 | −4 | 4.13 | −4.36 | 4.07 |
| −2 | 4.51 | −2 | 4.51 | −4 | 4.25 |
| −0.05 | 4.9 | −1.85 | 4.54 | −2 | 5.46 |
| 0 | 4.93 | 0 | 5.7 | 0 | 7.03 |
| 2 | 6.31 | 2 | 7.32 | 2 | 9.08 |
| 4 | 8.1 | 4 | 9.43 | 4 | 11.8 |
| 6 | 10.44 | 6 | 12.22 | 6 | 15.48 |
| 8 | 13.55 | 8 | 15.98 | 8 | 20.64 |
| 10 | 17.77 | 10 | 21.24 | 10 | 28.43 |
| 12 | 23.77 | 12 | 29.18 | 11.13 | 60 |
| 14 | 33.27 | 13.23 | 60 | | |
| 14.67 | 60 | | | | |

While the invention is described in connection with the exemplary embodiments and examples which are described herein, many equivalent modifications and variations will be obvious for those skilled in the art when this description is known. Consequently the exemplary embodiments of the invention described hereinbefore are to be considered as illustrative and not restrictive. Various changes in the described embodiments can be made without departing from the sprit and scope of the invention.

The invention is defined according to the following claims.

The invention claimed is:

1. A method for purification of contaminated water by hydrate formation and separation of hydrates from contaminated water enriched with contaminants characterized in that the water to be purified is passed via a first pipe into a first container with suitable pressure and temperature conditions to obtain hydrate formation, in said container the water is mixed with a hydrate-forming compound which is supplied via a second pipe, wherein at least a portion of the mixture of hydrate and contaminated water is recycled to said first container via a third pipe as hydrate-forming seed, and the rest is passed to a separator where the mixture is separated into contaminated water and a hydrate, the hydrate is passed to a second container via a fourth pipe, in said second container the temperature is raised so that the hydrate dissociates into pure water and hydrate-forming compound, the hydrate-forming compound from said second container is passed back to the first container for hydrate formation via said second pipe and the pure water is taken out as a product.

2. The method according to claim 1, wherein the contaminants comprise one or more components selected from the group consisting of hydrocarbons, organic and inorganic salts, dust, mud, metals, sand, gas, radioactive compounds, and biological material.

3. The method according to claim 1, wherein the contaminated water which has been separated off is handled by recirculation to upstream process steps or deposition/disposal.

4. The method according to claim 1, wherein hydrate formation is carried out in several steps by subjecting the contaminated water from the separator to repeated hydrate formation processes in series until the concentration of contaminants in the contaminated water is too high for further hydrate formation.

5. The method according to claim 1, wherein the hydrates harvested from the separator are subjected to a washing step prior to dissociation to pure water and hydrate forming gas.

6. The method according to claim 1, wherein the hydrate forming compound supplied to the first container through the second pipe is selected from lower hydrocarbons, $CO_2$, halogenated hydrocarbons, wherein halogen is selected from chlorine and fluorine, tetrahydrofuran, ethylene oxide, noble gases selected from helium, neon, argon, xenon, krypton, sulphur hexafluoride, dinitrogen oxide.

7. The method according to claim 6, wherein the hydrate forming compound supplied to the first container through the second pipe is selected from $C_1$-$C_5$ hydrocarbons or $CO_2$.

8. The method according to claim 7, wherein the hydrate forming compound supplied to the first container through the second pipe is selected from methane, ethane, propane, or $CO_2$.

9. The method according to claim 8, wherein the hydrate forming compound supplied to the first container through the second pipe is selected from methane or $CO_2$.

10. The method according to claim 1, wherein the pressure and temperature conditions are:

T<30° C., P>1 bar.

11. The method according to claim 10, wherein the pressure and temperature conditions are:

T<20° C., P>5 bar.

12. The method according to claim 11, wherein the pressure and temperature conditions are:

T<10° C., P>20 bar.

13. The method according to claim 1, wherein hydrate particles which are supplied through the third pipe to the hydrate formation step have a diameter of maximum 3 mm.

14. The method according to claim 13, wherein hydrate particles which are supplied through the third pipe to the hydrate formation step have a diameter of maximum 500 μm.

15. The method according to claim 14, wherein hydrate particles which are supplied through the third pipe to the hydrate formation step have a diameter of maximum 100 μm.

16. The method according to claim 1, wherein the hydrate is harvested by a process selected from the group consisting of sedimentation, filtration, centrifugation, flotation.

17. The method according to claim 1, wherein the hydrates dissociate through an increase in temperature and/or reduction in pressure.

18. The method according to claim 1, wherein the hydrate separated by the separator is a pure hydrate.

* * * * *